(12) United States Patent
Lalla et al.

(10) Patent No.: US 6,930,632 B2
(45) Date of Patent: Aug. 16, 2005

(54) METHOD AND DEVICE FOR DETERMINING THE LEVEL OF A FILLING IN A CONTAINER

(75) Inventors: Robert Lalla, Lörrach (DE); Bernhard Michalski, Maulburg (DE); Herbert Schroth, Schopfheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/203,623

(22) PCT Filed: Feb. 14, 2001

(86) PCT No.: PCT/EP01/01619

§ 371 (c)(1),
(2), (4) Date: May 5, 2003

(87) PCT Pub. No.: WO01/61287

PCT Pub. Date: Aug. 23, 2001

(65) Prior Publication Data

US 2004/0150553 A1 Aug. 5, 2004

(30) Foreign Application Priority Data

Feb. 17, 2000 (DE) .......................... 100 07 187

(51) Int. Cl.$^7$ ................... G01F 23/284; G01S 13/00
(52) U.S. Cl. .................. 342/124; 342/118; 342/175; 342/195; 73/290 R; 73/304 R
(58) Field of Search ................ 73/149, 290 R, 73/304 R, 304 C, 305, 307, 308; 367/87, 99; 342/118, 123, 124, 175, 192–197

(56) References Cited

U.S. PATENT DOCUMENTS 5,233,352 A    8/1993   Cournane
5,365,178 A *  11/1994  Van Der Pol ............... 342/124
5,406,842 A *  4/1995   Locke ......................... 342/124
5,614,911 A *  3/1997   Otto et al. .................. 342/124
6,107,957 A *  8/2000   Cramer et al. ............. 342/124
6,492,933 B1 * 12/2002  McEwan ..................... 342/124

FOREIGN PATENT DOCUMENTS

| DE | 4233677 A1 | 4/1994 |
|---|---|---|
| DE | 69316080 T2 | 7/1998 |
| DE | 29815069 U1 | 2/1999 |
| EP | 0601884 A2 | 6/1994 |
| EP | 0875772 A3 | 11/1998 |
| EP | 0875772 A2 | 11/1998 |

* cited by examiner

Primary Examiner—Bernarr E. Gregory
(74) Attorney, Agent, or Firm—Bacon & Thomas

(57) ABSTRACT

The invention relates to a method and a device for determining the level of a filling (1) in a container (2). The aim of the invention is to provide a method and a device for measuring said level which are economical to carry out/produce and which offer an especially high degree of measuring accuracy. To this end, the inventive method provides that transmit signals are sent in the form of a first binary-weighted pulse sequence of transmit pulses with a predetermined pulse repetition duration ($\tau_R$) and a predetermined pulse sequence length (L) in the direction of the surface (3) of the filling (1); and the echo signals of the transmit pulses reflected on the surface (3) of the filling (1) are sampled with a second, preferably continuous sequence of sampling pulses of the pulse repetition duration $\tau_R$, the second pulse sequence being delayed ($\tau_S$) in relation to the first pulse sequence and the components of the sampling values that correspond to the echo signals with a propagation time of $\tau=\tau_S$ being retained while components that correspond to echo signals with a propagation time of $\tau_S<\tau<\tau_S+L\cdot\tau_R$ are deleted. The level of the filling (1) in the container (2) is determined using the weighted sampling values.

18 Claims, 4 Drawing Sheets

| | Bit Sequence | Running Time | | | | | | | | |
|---|---|---|---|---|---|---|---|---|---|---|
| | | 0 | τ | 2·τ | 3·τ | 4·τ | 5·τ | 6·τ | 7·τ | ... |
| Start-Up Phase (No Integration) | 1 | + | ? | ? | ? | ? | ? | ? | ? | ... |
| | 1 | + | + | ? | ? | ? | ? | ? | ? | ... |
| | 1 | + | + | + | ? | ? | ? | ? | ? | ... |
| | 0 | - | - | - | - | ? | ? | ? | ? | ... |
| | 0 | - | - | - | - | - | ? | ? | ? | ... |
| | 1 | + | + | + | + | + | + | ? | ? | ... |
| | 0 | - | - | - | - | - | - | - | ? | ... |
| 1st Period | 1 | + | + | + | + | + | + | + | + | ... |
| | 1 | + | + | + | + | + | + | + | + | ... |
| | 1 | + | + | + | + | + | + | + | + | ... |
| | 0 | - | - | - | - | - | - | - | - | ... |
| | 0 | - | - | - | - | - | - | - | - | ... |
| | 1 | + | + | + | + | + | + | + | + | ... |
| | 0 | - | - | - | - | - | - | - | - | ... |
| 2nd Period | 1 | + | + | + | + | + | + | + | + | ... |
| | 1 | + | + | + | + | + | + | + | + | ... |
| | 1 | + | + | + | + | + | + | + | + | ... |
| | 0 | - | - | - | - | - | - | - | - | ... |
| | 0 | - | - | - | - | - | - | - | - | ... |
| | 1 | + | + | + | + | + | + | + | + | ... |
| | 0 | - | - | - | - | - | - | - | - | ... |
| Sum | | 4 | 0 | 0 | 0 | 0 | 0 | 0 | 4 | ... |

Fig. 2

METHOD AND DEVICE FOR DETERMINING THE LEVEL OF A FILLING IN A CONTAINER

TECHNICAL FIELD

The invention relates to a method and a device for determining the level of a filling in a container.

BACKGROUND OF THE INVENTION

For detecting the level of liquids or bulk materials in containers, contactless measuring systems are increasingly used. As the measurement radiation, microwaves, ultrasound waves, electromagnetic pulses, light pulses, or—in particularly critical applications—radioactive rays are used.

In many areas of use, such as petroleum chemistry, chemistry, and the foods industry, high-precision measurements of the level of liquids or bulk materials in containers (tanks, silos, etc.) are needed. Increasingly, TDR sensors are therefore used, in which brief electromagnetic high-frequency pulses or continuous microwaves are input into a conductive elongated element, such as a rod probe or cable probe, and are introduced through the conductive element into the container in which the product is stored. TDR is the abbreviation for time domain reflectometry.

In terms of physics, in this measuring method the effect is utilized that at the boundary face of two different media, such as air and oil, or air and water, because of the abrupt change (discontinuity) in the dielectric constants of the two media, some of the guided electromagnetic pulses or the guided microwaves are reflected and returned to a receiving device via the conductive element. The reflected portion of the electromagnetic pulses or microwaves is greater, the more different the dielectric constants of the two media are. The distance from the boundary face can be determined from the propagation time of the pulses or waves. If the empty distance of the container is known, then the level of product in the container can be calculated afterward.

Sensors with guided high-frequency signals (pulses or waves) are distinguished over sensors that freely broadcast high-frequency pulses or waves (free-field microwave systems or FMR, also called "genuine radar systems") by substantially lower attenuation. The reason for this is that the power flow is effected quite intentionally along the rod or cable probe or conductive element. Moreover, sensors with guided high-frequency signals in the near range have a higher measurement quality than freely broadcasting sensors.

Another advantage of sensors with guided high-frequency signals is the high degree of safety and reliability of the level measurement performed. This is because the measurement with guided transmission signals is more independent of the properties of the product, the container construction (such as its materials and geometry), or other operating conditions (such as dust and deposits).

From U.S. Pat. No. 5,233,352, a level measuring device has been disclosed in which two pulse generators generate two binary pulse trains. The second pulse train is delayed compared to the first pulse train, and the time lag is designed to be variable and is dimensioned such that the time lag as a consequence of the propagation time of the first pulse train is equal to the set time lag between the two pulse trains. The correct time lag is ascertained by means of autocorrelation of the two pulse trains.

One disadvantage of this disclosed embodied is considered to be that for operating the known measuring device, high-frequency pulse trains have to be used. Only in that way can high enough measurement accuracy be achieved.

SUMMARY OF THE INVENTION

The object of the invention is to provide a method and a device for level measurement that can be realized economically and that are moreover distinguished by enhanced measurement accuracy.

In terms of the method, the object is attained by the following method steps: Transmission signals in the form of a first binary-weighted train of transmission pulses (→first binary pulse train) are transmitted in the direction of the surface of the product at a predetermined pulse repetition duration $\tau_R$ and with a predetermined sequence length L; afterward, echo signals of the transmission pulses reflected from the surface of the product are sampled with a second, preferably continuous train of sampling pulses of the pulse repetition duration $\tau_R$, the second pulse train has a time lag ($\tau_S$) relative to the transmission pulses; and components of the sampling values that correspond to echo signals with a propagation time of $\tau=\tau_S$ are retained, while components that correspond to echo signals with a transmit of $\tau_S<\tau<\tau_S+L\cdot\tau_R$ are deleted. On the basis of the sampling values, the level of the product in the container is determined.

One essential advantage of the method of the invention—as of the device of the invention—over the versions known until now is that echo signals with a propagation time greater than the inverse of the pulse train frequency (→pulse repetition duration) and less than the sequence length L of the transmission pulse train do not enter into the outcome of measurement and thus into the calculation of the level. It is therefore no longer necessary to wait, after sending a transmission pulse, until the corresponding echo signal has entirely faded. Consequently the pulse train frequency can be raised and thus the measurement speed can be increased. Or in other words, because of the presence of a greater number of measurement values within a defined time interval, the signal-to-noise ratio and thus the quality of the fill measurement can be improved. If the matter is considered from the standpoint that the pulse train frequency is already high enough, then one profits from the fact that the outcome of measurement is free of intrinsic interference that is caused by vagabond echo signals (overshooting).

In an advantageous refinement of the method of the invention, the sampling values are averaged or integrated. If the most recently sent transmission pulse in the binary pulse train is not suppressed, then the sampling values are integrated upward; conversely, if the most recently sent transmission pulse in the binary sequence has been suppressed, then the inverted sampling value is integrated upward. The integrator furnishes the superposition of all the instantaneous values of the echo signals at the points $\tau=\tau_S+k\cdot\tau_R$. Advantageously, the integration is performed via the single sequence length L of the binary transmission pulse train.

Preferably, the binary-weighted transmission pulse train is controlled by means of a feedback shift register.

In terms of the apparatus, the object is attained in that at least the following components are provided: a signal generating unit, which generates a first binary-weighted train of transmission pulses at a pulse repetition duration $\tau_R$ and a sequence length L and a second, continuous pulse train of sampling pulses at a pulse repetition duration $\tau_R$; a transceiver unit that transmits the first binary pulse train in the direction of the surface of the product and receives the reflected echo signals; a time delay circuit, which delays the second pulse train (→time lag $\tau_S$) relative to the first pulse train; a sampling circuit, which samples the echo signals, reflected from the surface, of the first pulse train with the sampling pulses of the second, continuous pulse train, and components of the sampling values that correspond to echo signals with a propagation time of $\tau=\tau_S$ are retained, while the components that correspond to echo signals with a propagation time of $\tau_S<\tau<\tau_S+L\cdot\tau_R$ are deleted; and an evaluation circuit, which from the sampling values determines the level of the product in the container.

The sensor is preferably a sensor that operates with electromagnetic pulses. It is understood that the invention is not limited to electromagnetic pulses; it can also use other signals (ultrasound, microwave or light pulses). If electromagnetic pulses are used, then the transmitter unit is an apparatus in which the transmission pulses are introduced into the medium along a conductive element. This apparatus is quite well known per se from the prior art.

Looking first at the prior art, the following is found: In the case of a single transmission/echo pulse, the sampling circuit furnishes a sampling value of the echo signal after the length of time $\tau_S$. If a continuous train of transmission pulses is involved, then the sampling circuit furnishes the superposition, that is, the sum of all the instantaneous values of the echo signal at the points $\tau=\tau_S+k\cdot\tau_R$, where $k\geq 0$.

Conversely, if as proposed by the invention a periodic binary-weighted pulse train of sequence length L is used, then the sampling circuit furnishes the superposition of only those components of the echo signals that originate in an actually sent transmission pulse, and not in a suppressed transmission pulse.

An advantageous refinement of the device of the invention provides an integrator that performs an averaging or integration of the sampling values.

A favorable embodiment of the device of the invention moreover proposes that the first binary-weighted pulse train is a pseudo-random sequence. Preferably, the first binary-weighted pulse train is generated by means of a feedback shift register.

It has proved especially favorable if the signal generating unit has a pulse frequency generator, a first sequence controller, and a first pulse former; the pulse frequency generator generates a pulse train at the pulse repetition duration $\tau_R$; the first sequence controller, from the pulse train, generates a binary-weighted pulse train with the pulse sequence length L; and the pulse former, from the pulses of the binary-weighted pulse train, generates steep-edged transmission pulses.

Also in accordance with an advantageous embodiment of the device of the invention, it is suggested that the time delay circuit be supplied with the pulse train generated by the pulse frequency generator, and that from the pulse train, the time delay circuit generate a pulse train delayed by the time lag $\tau_S$.

In an advantageous refinement of the device of the invention, a second sequence controller is provided, which generates a train of sampling pulses with the pulse repetition duration $\tau_r$ and which adjusts the delay circuit in equidistant increments. Preferably, the second sequence controller performs the adjustment of the time delay circuit in equidistant increments of the delay time $\tau_S$. It is also provided that the second sequence controller resets the integrator after integration of the reflected sampling pulses; the integration is preferably performed via the sequence length L, or multiples of it.

BRIEF DESCRIPTION OF THE DRAWINGS

The invention will be described in further detail in conjunction with the appended drawings. Shown are:

FIG. 2: an illustration of the upward and downward integration of the sampling values;

DESCRIPTION OF THE PREFERRED EMBODIMENTS

Figure 1:
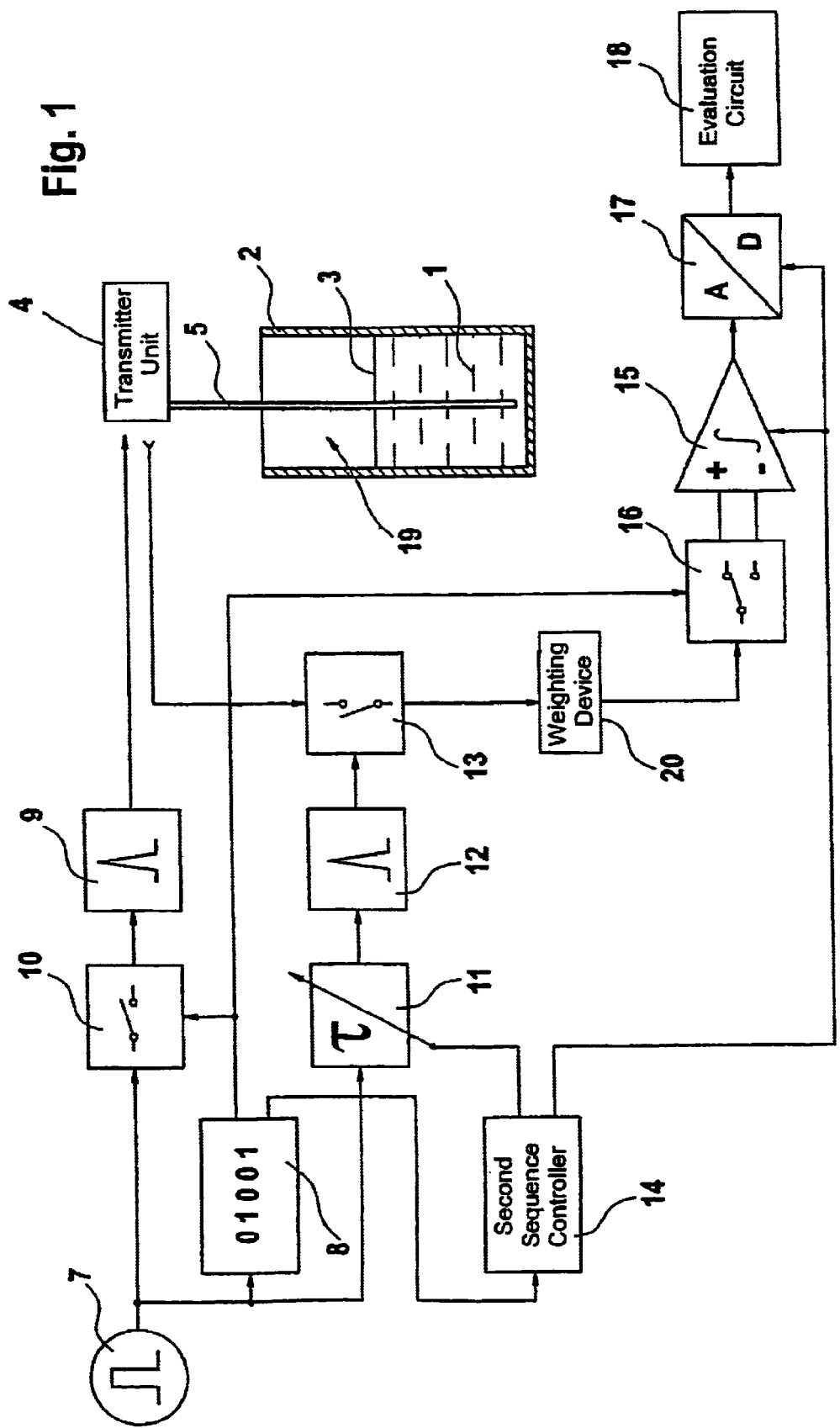
FIG. 1: a schematic illustration of one embodiment of the device of the invention.

FIG. 1 shows a schematic illustration of a preferred embodiment of the device of the invention. A pulse frequency generator (7) generates a continuous train of pulses, which in an advantageous refinement of the invention have a fixedly predetermined pulse repetition rate or pulse repetition duration $\tau_R$. It is possible to generate a binary weighting of the pulse train by means of a feedback shift register. A shift register of this kind is described for instance in the book entitled "*Krytologie*" [Cryptology] by Patrick Horster, pp. 56–59, B. I. Verlag, 1985. No attempt was made to show the shift register separately in FIG. 1.

The pulses in the case shown are square pulses, but the invention is in no way limited to this particular pulse shape. The pulse repetition duration $\tau_R$ is selected such that even when the maximum propagation distance is traversed, it is assured that a subsequent transmission pulse will not be sent until the previous transmission pulse has returned in the form of an echo signal. The frequency of the pulses is on the order of magnitude, depending on the particular application, of several hundred kHz to approximately 10 MHz.

The first sequence controller (8) is clocked with the first pulse train. From the continuous pulse train, the sequence controller (8) generates a periodic binary-weighted pulse train, by blanking out certain pulses in the pulse train. The blanking out is preferably done by having the first sequence controller (8) actuate the switch (10) in accordance with the predetermined bit rate. Thus the desired periodic binary-weighted pulse train is available at the output of the switch (10). A first pulse former (9) is supplied with this binary pulse train. From the square pulses, this pulse former generates steep-edged transmission pulses, which are output—in the case shown—to the TDR sensor (19). A TDR sensor of this kind, comprising a transmitter unit (4) and a conductive element, is described for instance in U.S. Pat. No. 5,233,352 already cited above.

The pulse train generated by the pulse frequency generator (7) is also applied to the input of the time delay circuit (11). Via the time delay circuit (11), a second, continuous pulse train with the pulse repetition duration $\tau_R$ is generated, which is delayed relative to the first periodic binary pulse train. The time lag $\tau_S$ is settable; it is set to whatever value is desired by means of the second sequence controller (14).

A second pulse former (12) is supplied with the second, delayed pulse train and from it generates a train of steep-edged pulses with the pulse repetition duration $\tau_R$. In time slots that are determined by the train of sampling pulses, a sampling circuit (13) samples the echo signal furnished by the TDR sensor (19) and by that means generates a sampled propagation time signal. The second sequence controller (14) adjusts the time delay circuit (11). Preferably, the adjustment is done in equidistant increments of the time lag $\tau_S$.

The integrator (15) integrates the sampled echo signal upward, if the first sequence controller (8) has not suppressed the associated transmission pulse. In the event that the most recently sent transmission pulse was suppressed by the first sequence controller (8), then the integrator (15) integrates the sampled echo signal, inverted by the inverter (16), upward. Depending on the desired characteristic curve of the measurement system, a nonlinear amplitude weighting is done by means of a weighting device (20) connected upstream of the inverter (16). The integrator (15), and its output, furnishes the integrated echo signal. The integrated echo signal is converted by the A/D converter (17), on command of the second sequence controller (14), into digital measurement data at certain times. The integrator (15) is then reset by the second sequence controller (14). From the digital measurement data that are furnished by the A/D converter (17), an evaluation circuit (18), in particular a digital computer, ascertains the propagation time of the transmission/echo pulses and from that ascertains the applicable level of the product (1) in the container (2).

FIG. 2, in the form of a table, illustrates the upward and downward integration of the sampling values. Three periods are shown, for a binary sequence that can be described by the bit pattern 1110010. The sampling of the reflected echo signal takes place in each case at the points $\tau=\tau_S+k\cdot\tau_R$, where $k \geq 0$. In the first period, assumed to be the startup phase, no integration is performed. As already noted, the sampling circuit (13) furnishes only those instantaneous values of the echo signals that originate in an actually sent transmission pulse and not in a transmission pulse that was suppressed in the past. If the most recently sent transmission pulse in the binary pulse train has not been suppressed, then the integrator integrates the sampling values upward. If the most recent transmission pulse in the binary pulse train was suppressed, then the inverted sampling value is integrated upward. Consequently, the integrator furnishes only the superposition of all the components of the echo signals at the points $\tau=\tau_S+k\cdot\tau_R$. None of the propagation time signals that have a propagation time greater than the inverse value of the pulse train frequency of the first binary pulse train and less than the sequence length L of the first pulse train are incorporated into the outcome of measurement.

Expediently, the integration is performed via the single sequence length L of the binary transmission train and then the state attained at the time of the integrator (15) is taken on for evaluation (this is represented by the arrows in FIG. 2), and the integrator (15) is then reset. The chronological position of an integration interval relative to the binary pulse train is moreover of no significance for this special embodiment of the device of the invention.

Because of the invention, it is no longer necessary, after a transmission pulse has been sent to the TDR sensor (19) (or to the antenna), to wait until the resultant echo signal has faded completely. Consequently, the pulse train frequency and thus the measurement speed can be increased. In other words, since increasing the number of measurement values available within a certain time interval has been successfully accomplished, the signal-to-noise ratio and thus the quality of level measurement can be improved considerably.

Conversely, if the pulse train frequency is already high enough, then according to the invention one profits from the fact that now only a relatively slight intrinsic interference in the measurements occurs from vagabond echoes. Moreover, the vagabond echo signals are caused by overshooting.

Figure 3:
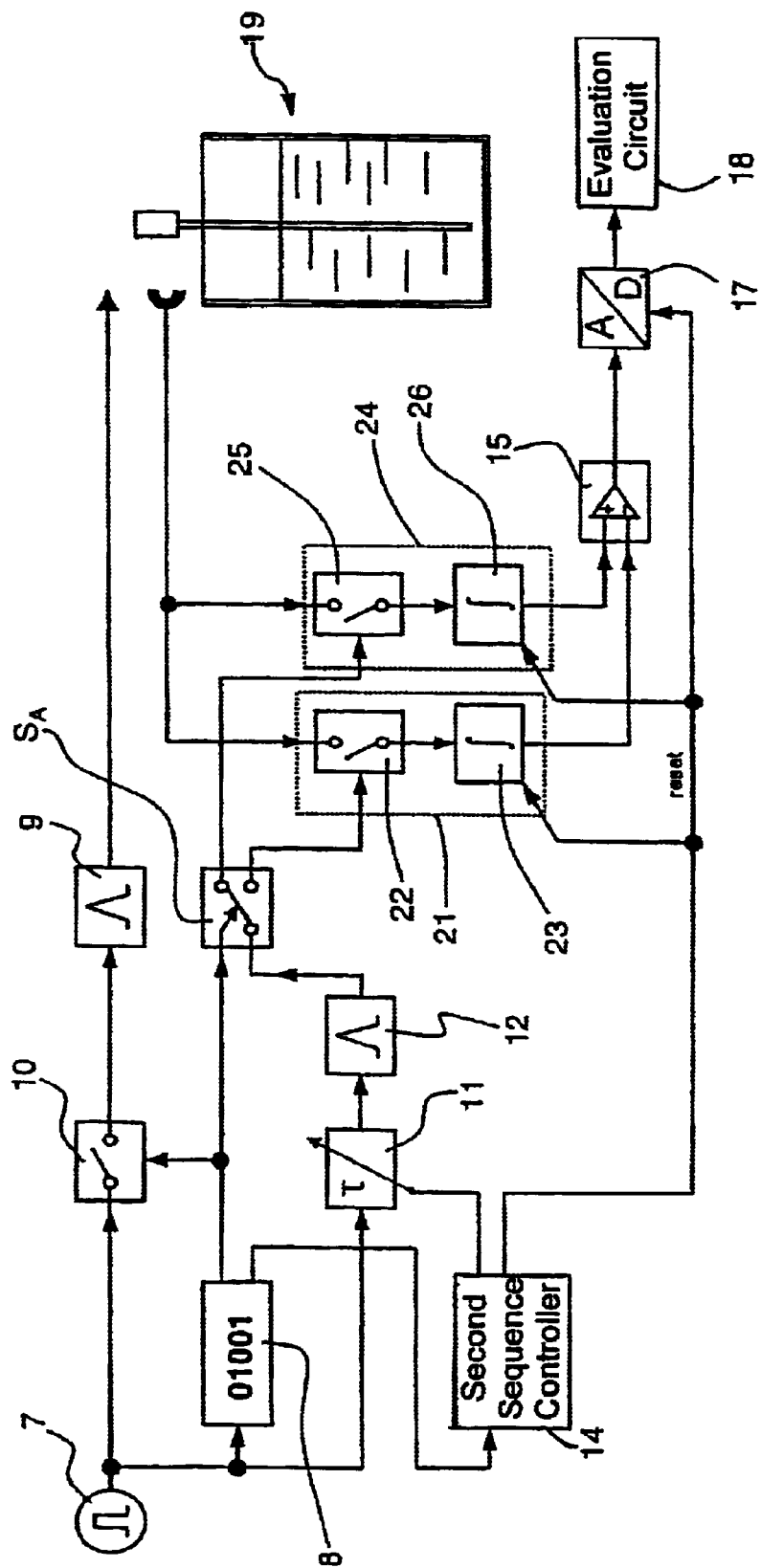
FIG. 3: a schematic illustration of a second embodiment of the device of the invention.
Figure 4:
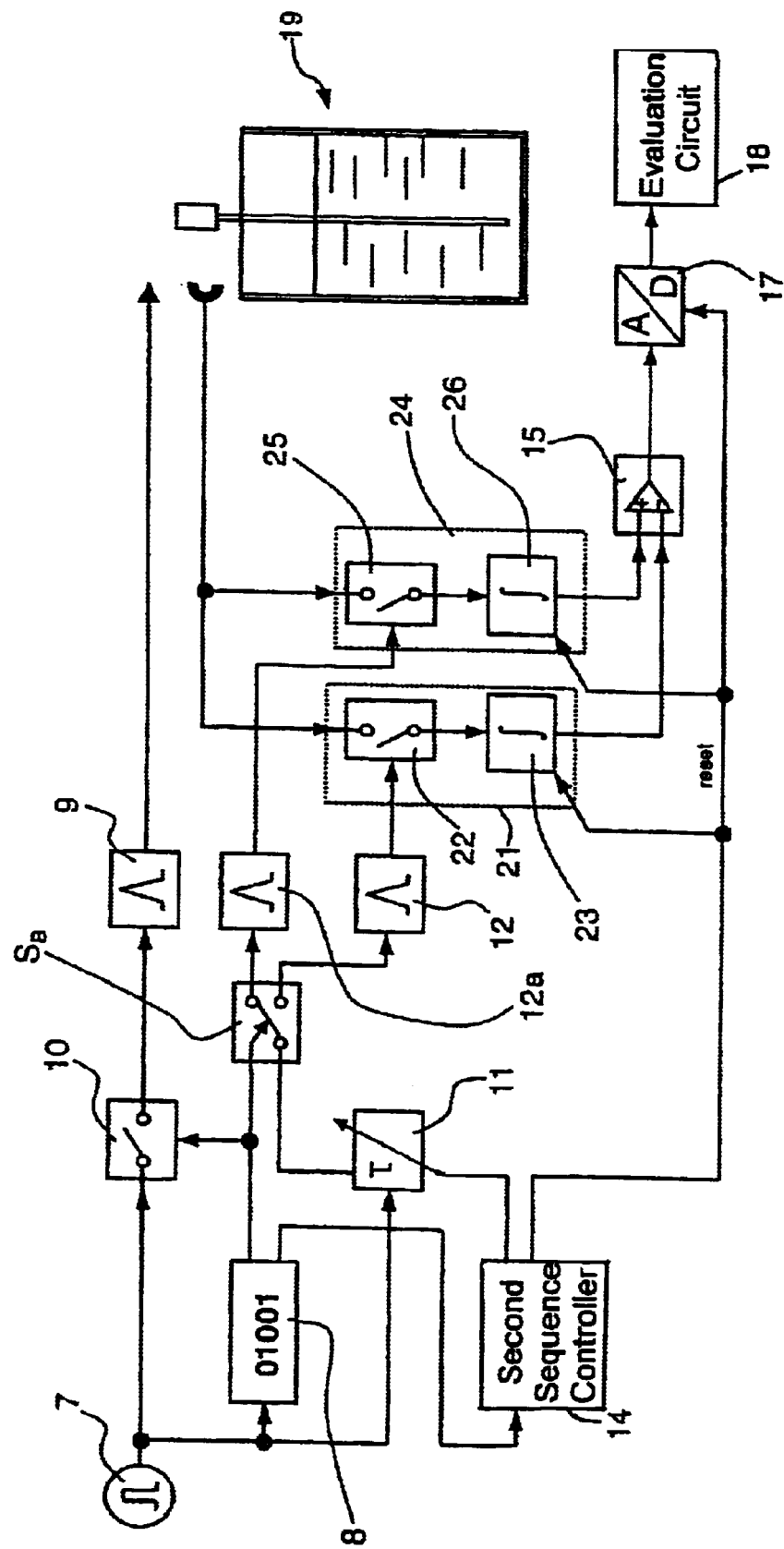
FIG. 4: a schematic illustration of a third embodiment of the device of the invention.

FIGS. 3 and 4 show a second and third preferred embodiment of the device of the invention; these differ from the version shown in FIG. 1 in having two separate sampling circuits 21, 24. Otherwise, they are of corresponding design.

These embodiments improve the aforementioned signal-to-noise performance still further, because in principle they each detect only signals determined by noise and in a sense "subtract" them from the echo signals that have noise in order to obtain virtually noise-free signals. The signals determined solely by noise are obtained in a kind of idling mode, when no transmission pulses for measurement are being sent to the TDR device 19.

In the version of the device of the invention shown in FIG. 3, for that purpose the pulses generated by the second pulse former 12 are supplied, via a switch $S_A$ to either the first or the second sampling circuit 21, 24. Both the first and the second sampling circuit are represented in FIGS. 3 and 4 by a sampling circuit 22 and 25 and an integrator 23 and 26, respectively.

The mode of operation of the version shown in FIG. 3 is as follows:

The selection between the two sampling circuits 21, 24 is made, as noted, via the switch $S_A$, whose control input is triggered by the first sequence controller 8. The sampler signal is then applied by the second pulse former 12, via switch $S_A$, to the applicable sampling circuit 21 or 24.

The two sampling circuits 21 and 24 each have the respective integrator 23 and 26, whose outputs are carried to the integrator 15 that operates as a differentiating circuit. In it, the difference between the noisy signal from the first sampling circuit 21 and the "pure noise" signal from the second sampling circuit 24 is found.

The difference between the versions of FIGS. 3 and 4 is essentially that the version of FIG. 3 makes do with only one second pulse former 12. By comparison, in the embodiment of the invention shown in FIG. 4, the sampling circuit 21 is triggered by the second pulse former 12, and the sampling circuit 24 is triggered by an identical third pulse former 12a. The pulse formers 12 and 12a are selected by means of a switch $S_B$. Otherwise, the function and action are the same as in the embodiment of the invention shown in FIG. 3.

The advantage of the version of FIG. 4 is that the very steep-edged signals of the pulse formers 12, 12a are carried to the sampling circuits 21 and 24 not via a switch but rather directly. As a result, the signal form of the pulses is preserved.

LIST OF REFERENCE NUMERALS

1 Product
2 Container
3 Surface of the product
4 Transmitter unit
5 Conductive element
6 Signal generating unit
7 Pulse frequency generator
8 First sequence controller
9 First pulse former
10 Switch
11 Time delay circuit
12 Second pulse former
13 Sampling circuit
14 Second sequence controller
15 Integrator
16 Inverter
17 A/D converter
18 Evaluation circuit
19 TDR sensor
20 Weighting device
12a Third pulse former
21 Second sampling circuit 22 Sampling switch
23 Integrator
24 Third sampling circuit
25 Sampling switch
26 Integrator
$S_A$ Switch
$S_B$ Switch

What is claimed is:

1. A method for determining the level of a product in the container, the product defining a surface in the container, comprising the step of:

transmitting transmission signals in the form of a first binary-weighted train of transmission pulses in the direction of the surface of the product at a predetermined pulse repetition duration ($T_R$) and with a predetermined sequence length (L);

providing a second, preferably continuous train, of sampling pulses of pulse repetition duration ($T_R$) with a time lag ($T_S$) relative to the first transmission pulses;

sampling echo signals of the first transmission pulses reflected from the surface of the product with the second pulses; and retaining components of the sampling values that correspond to the echo signals with a propagation time ($T_S$), while components that correspond to echo signals with a transit of $T_S<T<T_S+L\cdot T_R$ are deleted, wherein on the basis of the sampling values, the level of the product in the container is determined.

2. The method as defined in claim 1, further comprising the step of:

inverting a partial quantity of the sampling values as a function of the binary weighting of the first transmission pulse train.

3. The method as defined in claim 1, further comprising the step of:

weighting the sampling values with a nonlinear amplitude function.

4. The method as defined in claim 1, further comprising the step of:

averaging or integrating sampling values, wherein said averaging or integrating of the sampling values is performed by way of the single or multiple pulse sequence length (L) of the binary weighting of the first transmission pulse train.

5. The method as defined in claim 1, further comprising the step of:

generating the binary weighting of the first transmission pulse train by means of a feedback shift register.

6. A device for determining the level of a product in a container, the product defining a surface in the container, comprising:

at least one signal generating unit, which generates a first binary-weighted train of transmission pulses at a pulse repetition duration ($T_R$) and a sequence length (L), and a second, continuous pulse train, of sampling pulses at a pulse repetition duration ($T_R$);

a transmitting unit that transmits said first binary-weighted pulse train in the direction of the surface of the product;

a time delay circuit which delays said second continuous sampling pulse train by ($T_S$) relative to said first binary-weighted transmission pulse train;

a sampling circuit which samples the echo signals of said first binary-weighted transmission pulse train, reflected from the surface of the product with the sampling pulses of said second, continuous pulse train, with components of the sampling values that correspond to said echo signals with a propagation time of ($T_S$) are retained and the components that correspond to echo signals with a propagation time of $T_S<T<T_S+L\cdot T_R$ are deleted; and an evaluation circuit which determines the level of the product in the container from the sampling values.

7. The device as defined in claim 6, wherein:

said signal generating unit has a pulse frequency generator, a first sequence controller, and a first pulse former;

said pulse frequency generator generates a pulse train at the pulse repetition duration ($T_R$);

said first sequence controller, from the pulse train, generates a binary-weighted pulse train with the pulse sequence length (L); and said pulse former, from the pulses of the binary-weighted pulse train, generates steep-edged transmission pulses.

8. The device as defined in claim 7, wherein: the binary weighting of the pulse train by said sequence controller involves a pseudo-random sequence.

9. The device as defined in claim 7, wherein: a feedback shift register which generates a pseudo-random sequence for weighting said first pulse train is provided in said sequence controller.

10. The device as defined in claim 6, wherein: said time delay circuit is supplied with the pulse train of said pulse frequency generator, and from the pulse train, a pulse train delayed by the time lag ($T_S$) is generated.

11. The device as defined in claim 10, wherein: a second sequence controller is provided, which adjusts said time delay circuit in predetermined increments.

12. The device as defined in claim 11, wherein: said second sequence controller performs the adjustment of said time delay circuit in equidistant increments of the delay time ($T_S$).

13. The device as defined in claim 6, wherein: from the pulse train delayed by $T_S$, steep-edged sampling pulses are generated by means of said second pulse former, with the aid of which pulses said sampling circuit samples echo signals.

14. The device as defined in claim 13, further comprising: a weighting device, wherein:

sampling pulses are weighted nonlinearly in amplitude by said weighting device.

15. The device as defined in claim 13, further comprising:

an inverter, wherein: sampled echo signals are reversed in polarity in said inverter under the control of said sequence controller.

16. The device as defined in claim 6, further comprising:

an integrator, wherein: said integrator integrates or averages sampling values.

17. The device as defined in claim 16, wherein: said second sequence controller resets said integrator after integration of the sampling pulses via the sequence length (L) or multiples thereof.

18. The device as defined in claim 6, wherein: two sampling circuits are provided, one sampling circuit is used for sampling signals in the idling mode, that is, without transmission pulses, and the other sampling circuit is used to sample echo signals in the measurement mode.

* * * * *